United States Patent
Klesenski

(10) Patent No.: US 8,068,804 B2
(45) Date of Patent: Nov. 29, 2011

(54) RECEIVER LOCAL OSCILLATOR LEAKAGE COMPENSATION IN THE PRESENCE OF AN INTERFERER

(75) Inventor: Kevin L. Klesenski, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 544 days.

(21) Appl. No.: 12/345,478

(22) Filed: Dec. 29, 2008

(65) Prior Publication Data

US 2010/0167677 A1    Jul. 1, 2010

(51) Int. Cl.
*H04B 1/10* (2006.01)
(52) U.S. Cl. ...................................................... 455/296
(58) Field of Classification Search .................. 455/296, 455/310, 311, 312, 323, 334
See application file for complete search history.

(56) References Cited

U.S. PATENT DOCUMENTS

| | | | | |
|---|---|---|---|---|
| 5,724,653 | A * | 3/1998 | Baker et al. | 455/296 |
| 7,558,550 | B2 * | 7/2009 | Brobston et al. | 455/232.1 |
| 7,929,060 | B2 * | 4/2011 | Yun et al. | 348/730 |

* cited by examiner

*Primary Examiner* — Jeffrey Zweizig
(74) *Attorney, Agent, or Firm* — Carrie A. Boone, P.C.

(57) ABSTRACT

A ZIF radio compensation method is disclosed. The ZIF radio compensation method employs high gain setting compensation values, which are reliably calculated for low gain settings, during entry of the radio into a communications network. Once the network entry is complete, these coarse calibration values are refined during times when no interfering signal is present. The ZIF radio compensation method allows a receiver to use no additional circuitry to achieve isolation, for potential cost savings. The ZIF radio compensation method further speeds up initial calibration, allowing the radio to join the communications network more rapidly.

20 Claims, 5 Drawing Sheets

RECEIVER LOCAL OSCILLATOR LEAKAGE COMPENSATION IN THE PRESENCE OF AN INTERFERER

TECHNICAL FIELD

This application relates to zero intermediate frequency (ZIF) radios and, more particularly, to addressing an unwanted direct current (DC) offset in the ZIF radio.

BACKGROUND

Zero intermediate frequency is a type of radio demodulation in which a mixer stage is used to convert an incoming signal to/from the baseband without generating an intermediate frequency. A zero intermediate frequency (ZIF) radio contains a local oscillator (LO) and a down-converter. The output of the local oscillator typically leaks into the input of a mixer. This generates an undesired DC component at the mixer output. The ZIF radio contains circuitry to cancel out this DC component. A measurement algorithm supplies the circuitry with compensation values, one set for each radio RF gain setting, since that setting affects the level of DC seen at the radio output.

In determining the compensation values, the algorithm ensures only the radio generates the undesired DC component by configuring it to minimize any input signal, typically by disconnecting the antenna from the receive path. For low gain settings (high attenuation), disconnecting the antenna can provide sufficient input isolation to calculate the compensation values. For higher gain settings (low attenuation), however, disconnecting the antenna usually does not provide sufficient input isolation in the presence of large power interferers when determining the calibration.

Thus, there is a need for a ZIF radio that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a ZIF radio compensation method is disclosed. The ZIF radio compensation method employs reliably calculated low RF gain setting compensation values, for high RF gain settings, during entry of the radio into a communications network. Once the network entry is complete, these coarse calibration values are refined during times when no interfering signal is present. The ZIF radio compensation method allows a receiver to use minimal circuitry to achieve more isolation, for potential cost savings. The ZIF radio compensation method further speeds up initial calibration, allowing the radio to join the communications network more rapidly.

Figure 1:
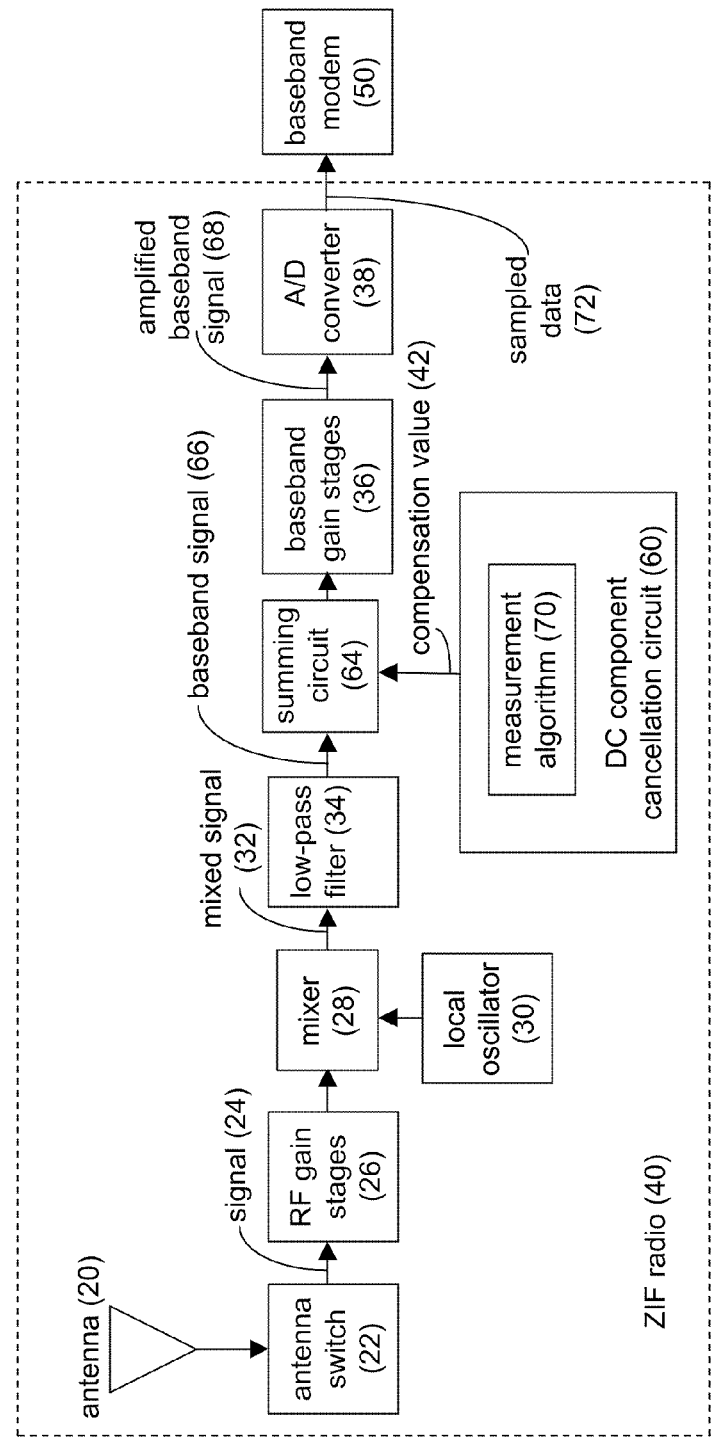
FIG. 1 is a block diagram of a ZIF radio and baseband modem, according to some embodiments.

FIG. 1 is a block diagram of a receiver 100, including a ZIF radio 40 and baseband modem 50, according to some embodiments. The ZIF radio receives a signal from an antenna 20, which may be enabled or disabled by an antenna switch 22. The received signal 24 is fed through one or more RF gain stages 26, then fed through a mixer 28, where the signal is mixed with a signal from a local oscillator 30. A low-pass filter 34 removes higher frequency components not related to the desired frequency components of the mixed signal 32, which is then amplified by the baseband gain stages 36. Before being input to the baseband modem 50, the amplified baseband signal 68 is converted to sampled data 72 by the analog-to-digital converter 38.

The antenna switch 22 is designed to isolate the antenna 20 from the rest of the radio 100. When the switch 22 is on, the antenna 20 is connected; when the switch is off, the antenna is disconnected. In some embodiments, the antenna switch 22 does not provide enough input isolation in the off state. In other embodiments, the antenna switch 22 is in the on state during receive LO compensation, due to modem operation considerations not related to the receive LO compensation determination. The ZIF radio compensation method 200 may be used in combination with other isolation techniques, i.e., in addition to or other than using the antenna switch 22 to achieve isolation. As explained above, the ZIF radio 40 typically contains an undesired DC component generated by an output of the local oscillator 30 leaking into the input of the mixer 28. The ZIF radio 40 includes a DC component cancellation circuit 60 to address this problem. The DC component cancellation circuit 60 includes a measurement algorithm 70, which measures the undesired DC component in isolation, that is, with the antenna 20 preferably disconnected, that is, with the antenna switch 22 turned off.

The DC component cancellation circuit 60 includes a measurement algorithm 70, which determines, for a given gain (attenuation) setting, the DC compensation value 42 that cancels out the unwanted DC component. A summing circuit 64 adds the DC compensation value 42 to the baseband signal 66 exiting the low-pass filter 34. Alternatively, the DC compensation value 42 may be added to the mixed signal 32, before entering the low-pass filter 34. In some embodiments, the measurement algorithm 70 is in the ZIF radio 40, as shown in FIG. 1. In other embodiments, the measurement algorithm 70 resides in the baseband modem 50. In still other embodiments, the measurement algorithm 70 is distributed between the ZIF radio 40 and the baseband modem 50.

The baseband signal 66 may be real or complex. Where the baseband signal is real, there would exist a single DC summing circuit 64, as shown in FIG. 1. Where the baseband signal is complex, there would exist two DC summing circuits, one for the real part, the other for the imaginary part of the baseband signal 66.

However, even when the switch 22 is off, the radio 40 may still pick up a signal from an interfering device, such as a base station or another radio operating at the same frequency in the communications network. In reality, it is difficult to achieve the isolation needed to enable the measurement algorithm 70 to calculate the compensation values at each gain (attenuation) setting of the ZIF radio 40. At low-gain settings, the measurement algorithm 70 can still be capable of determining the calibration, even in the presence of interferers. However, at high-gain settings, the interferers may impede successful measurement.

Figure 2:
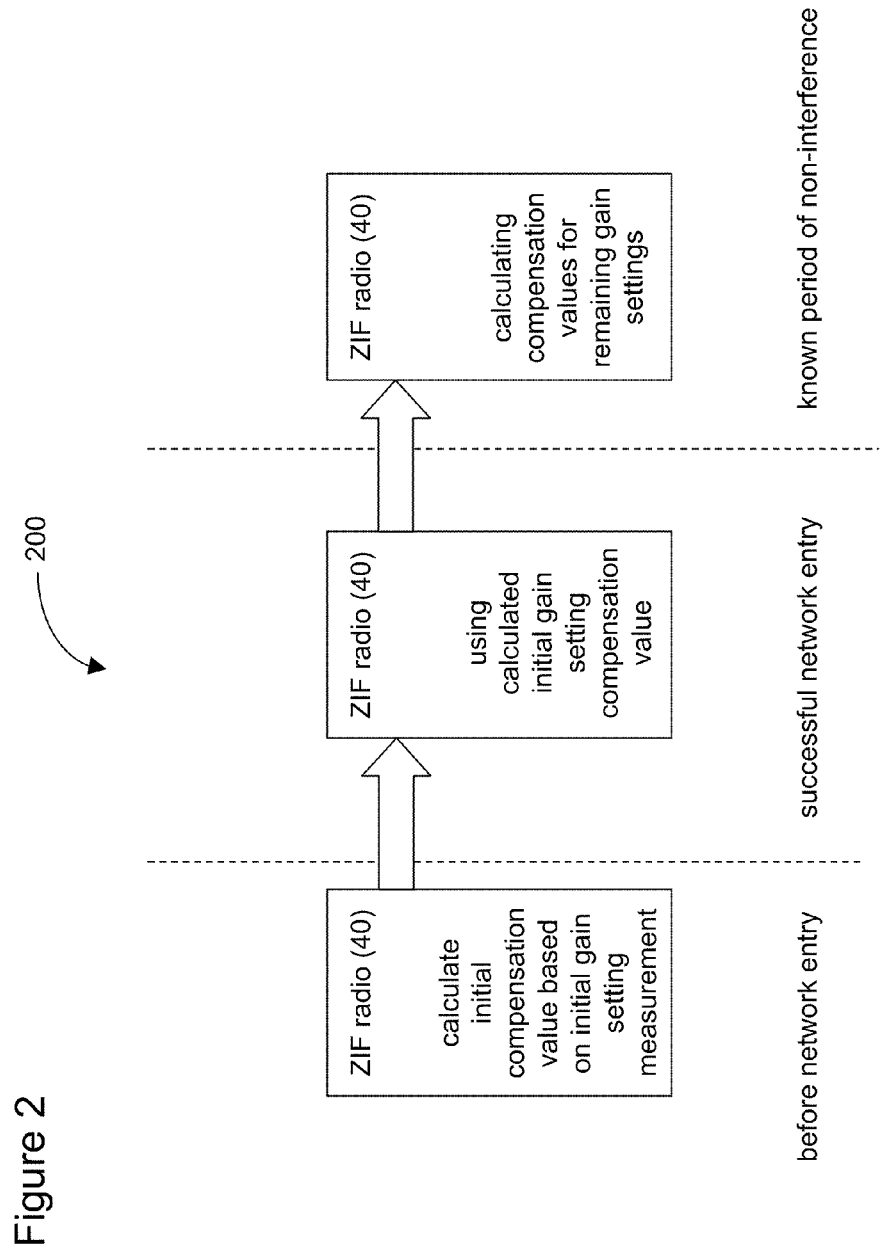
FIG. 2 is a simplified block diagram of a ZIF radio compensation method, according to some embodiments.

FIG. 2 is a simplified block diagram depicting a ZIF radio compensation method 200, according to some embodiments. The ZIF radio compensation method 200 performs receiver local oscillator leakage compensation in the presence of an interferer, such as a base station or other radio operating at the same frequency as the ZIF radio 40.

The ZIF radio compensation method 200 exploits the fact that compensation values for low-gain settings are sufficiently good for high gain settings during the modem's network entry phase. As illustrated in FIG. 2, a first compensation value based on a low-gain (high attenuation) setting is calculated before entry into the communications network. This one compensation setting, reliably calculated for the low-gain setting of the ZIF radio 40, is used for the remaining (lower) attenuator settings, as a sort of coarse calibration of the radio. The low-gain compensation value is used by the receiver 100 for the limited purpose of gaining network entry.

Although not optimal for continued use, the receiver 100 is able to successfully enter the communications network using the reliable low-gain (high attenuation) compensation value for all attenuator settings. Once the baseband modem 50 synchronizes with the communications network, there exist predefined time periods, known to the receiver 100, during which there is no interference to the ZIF radio 40. This time period may, for example, be communicated to the receiver 100 by its serving base station. During these known non-interfering periods, the ZIF radio compensation method 200 refines the coarse calibration value obtained initially, again using the measurement algorithm 70.

In some embodiments, the ZIF radio compensation method 200 allows the receiver 100 (FIG. 1) to use no additional circuitry to achieve isolation. Instead, the receiver 100 exploits this known non-interfering period that exists once the receiver is part of the communications network. This potentially saves the cost of a specially designed antenna switch that achieves a high degree of isolation compared to one that provides a lower degree of isolation, for a total cost reduction of the radio 40. Additionally, by focusing on the more reliable low-gain setting calibration before network entry, the ZIF radio compensation method 200 speeds up the initial calibration operations, allowing the receiver 100 to join the network more rapidly.

In some embodiments, rather than using the reliably calculated compensation value for the highest attenuator for the lower attenuators, the compensation values for the lower attenuators are calculated from a known function. For example, the known function may be the following in the case of a complex signal cancellation circuit:

$$DCI(n)=DCI(7)+\Delta_1*(7-n) \text{ and } DCQ(n)=DCQ(7)+\Delta_2*(7-n),$$

where DCI and DCQ are the in-phase and quadrature compensation values, respectively, n is the attenuator number, with n referring to a range of attenuator numbers between 0 and 7 (see FIG. 4), and $\Delta_1$ and $\Delta_2$ are known constants. Where there exists a known relationship that holds among the compensation values for the attenuators, the known function may be derived. The relationship between compensation values is determined from a representative set of ZIF radios if the relationship holds across all radios. Alternatively, the known function may be derived from a relationship between compensation values that is determined for a particular radio.

As an example of the former case, there may exist a known function that does not have to be exact, but which may produce compensation values closer to the ideal values for lower attenuators than replicating the highest attenuator compensation value into the compensation values for the lower attenuators. This relationship can be determined in many ways. For example, a set of radios may be randomly selected from the larger set of all radios. The ZIF radio compensation method 200, steps 200-206, as described below, is run at each of the RF attenuator settings with no interferer present at the antenna 20 input. The compensation values found for each attenuator are then saved for later analysis. The later analysis determines, in this example, two compensation values for each attenuator, one being the in-phase and the other being the quadrature compensation value.

In this same example, all in-phase and all quadrature compensation values may be separately averaged for each attenuator to provide a representative in-phase and quadrature compensation value pair for each attenuator, where averaging is a process known to those skilled in the art. From this data, the change from one compensation pair to an adjacent (in attenuator number) compensation pair can be determined by subtracting adjacent (in attenuator number) in-phase values and adjacent (in attenuator number) quadrature values separately, producing delta in-phase and delta quadrature values. All delta in-phase values and all delta quadrature values are averaged separately to arrive at the delta values, $\Delta_1$ and $\Delta_2$, in the above equation, for example. There are numerous ways for one skilled in the art to arrive at the delta values, $\Delta_1$ and $\Delta_2$, for the above equation. There are also numerous ways known to one skilled in the art to determine relationships, different from the above equation, between compensation values for the entire set of radios. This example, therefore, should not be construed as the only possibility. Another possibility known to those skilled in the art is a function of the highest attenuator compensation value may be dependent on factors not directly related to the other attenuator compensation values such as temperature and frequency.

Figure 3:
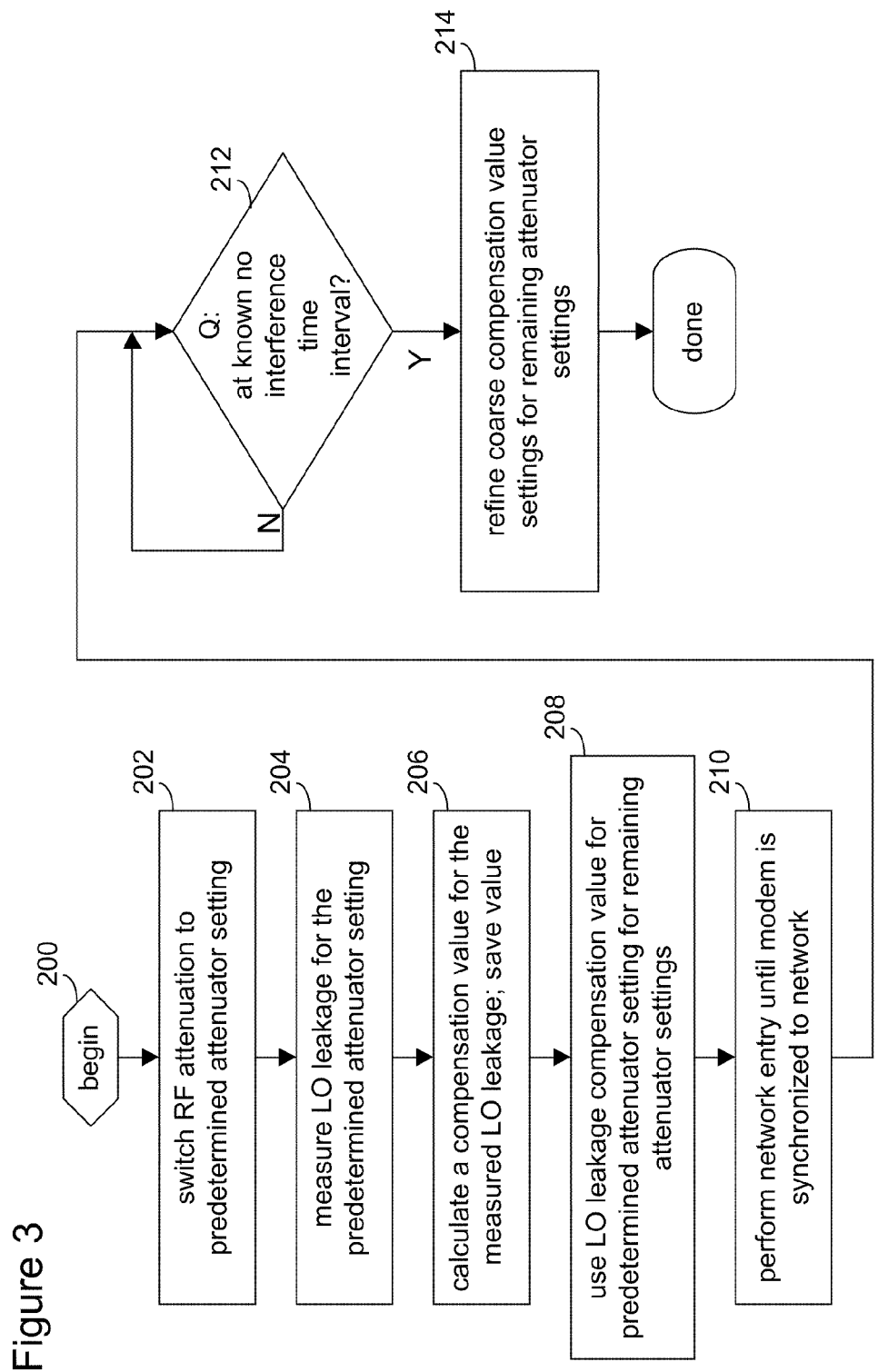
FIG. 3 is a flow diagram summarizing operation of the ZIF radio compensation method of FIG. 2, according to some embodiments.

FIG. 3 is a flow diagram showing, with more particularity, the operations of the ZIF radio compensation method 200, according to some embodiments. The ZIF radio compensation method 200 commences with the receiver 100 sending a command to the ZIF radio 40 to switch the RF attenuation to a predetermined attenuator setting (block 202) in the RF gain stages block 26. In some embodiments, the predetermined attenuator setting is the largest attenuator (lowest gain) setting. In other embodiments, the predetermined attenuator setting is one from which other compensation values are derived, such as with a known function that characterizes the radio.

For the largest attenuator embodiment, by setting the ZIF radio 40 to the lowest gain setting, the effects of any interferer that may be present are minimized. Next, the DC component cancellation circuit 60 measures the leakage from the local oscillator 30 for the predetermined attenuator setting (block 204). From this measured leakage, the measurement algorithm 70 calculates a compensation value. This value is saved (block 206), as the compensation value is to be used for other attenuator settings of the ZIF radio 40 (block 208).

Once a reliable compensation value has been calculated, this value is used for all attenuator settings of the ZIF radio 40 and the receiver 100 is ready for network entry. Network entry is performed until the baseband modem 50 is synchronized with the communications network (block 210). The coarse compensation values are not replaced with measured ones until the receiver 100 is in a known network time interval where there is no interference (block 212). Once the no-interference time interval is reached, the measurement algorithm 70 performs calculations, similar to those performed prior to network entry for the predetermined attenuator setting, for the remaining attenuator settings (block 214). This measurement may also be performed for the predetermined attenuator setting. In some embodiments, these calculations have a high degree of accuracy because there is no interference during this predefined time period.

Figure 4:
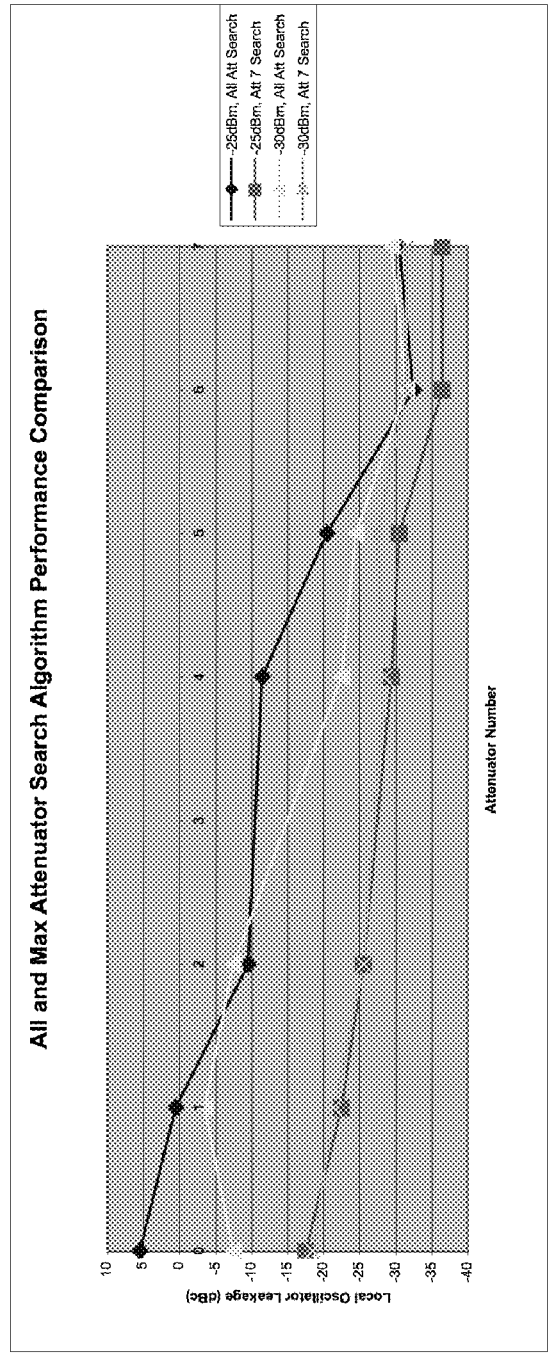
FIG. 4 is a graph showing empirical results of one embodiment of the ZIF radio compensation method of FIG. 2.
Figure 5:
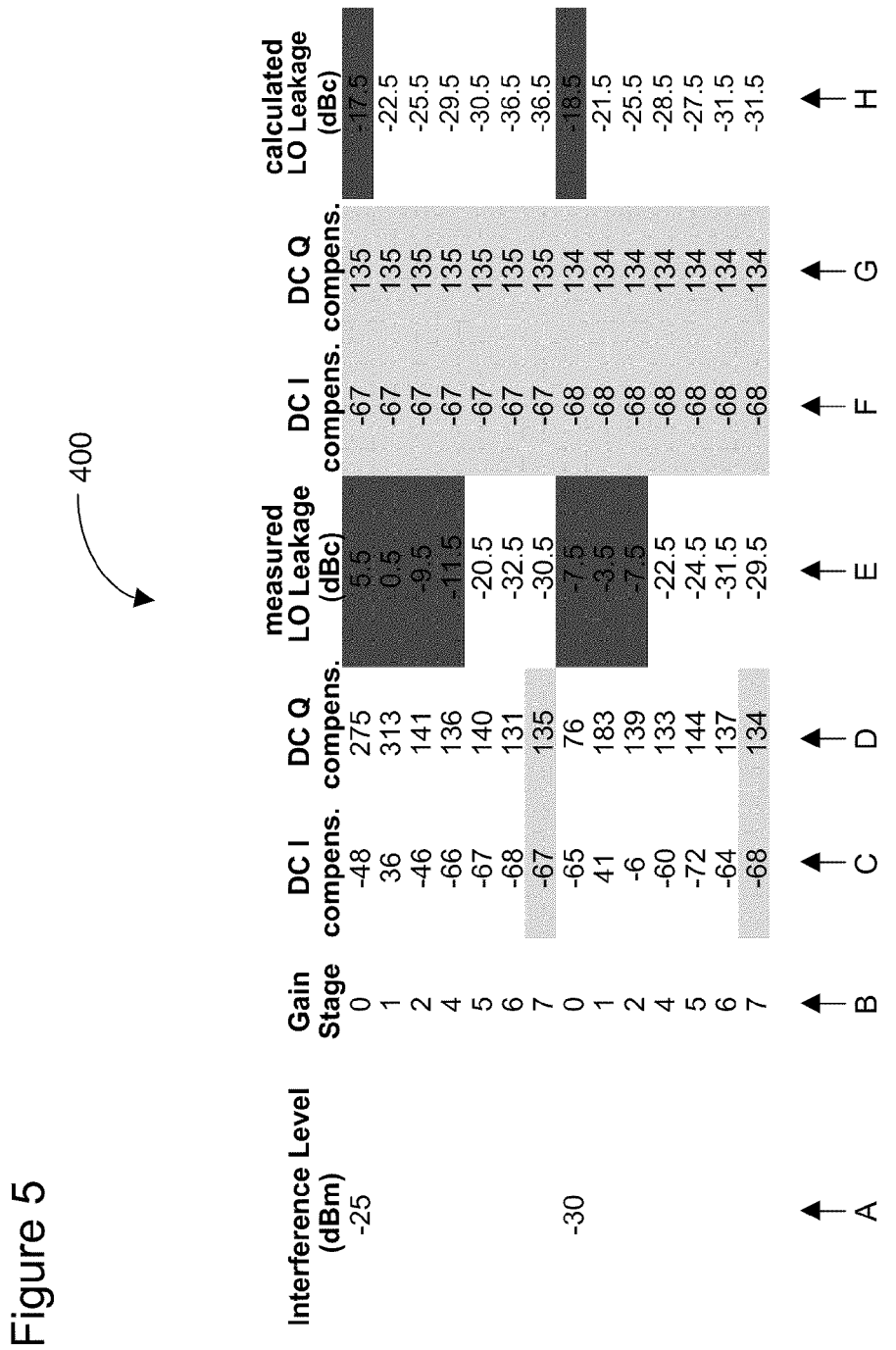
FIG. 5 is a chart associated with the graph of FIG. 4 showing empirical results of one embodiment of the ZIF radio compensation method of FIG. 2.

FIG. 4 is a graph 300 and FIG. 5 is an associated chart 400 showing measured performance of the ZIF radio compensation method 200 in setting the coarse compensation values. The resulting lower initial local oscillator leakage increases the probability of successful network entry, in some embodiments. The ZIF radio compensation method 200 subsequently provides refinement to the compensation values for the remaining attenuator settings.

The blue and yellow plot lines show the performance of the ZIF radio compensation method 200, steps 200-206, at each of seven RF attenuator settings with a strong interferer present at the antenna 20 input during operation of the method. A leakage level of about −20 dBc or less provides adequate DC compensation for radio network entry operation. Investigated interferer levels are −25 dBm and −30 dBm. As a point of reference, WiMAX (worldwide interoperability for microwave access) guidelines require radio operation with base station signal levels as high as −30 dBm. As the attenuation gets larger with increasing attenuator number, the LO leakage minimization performance improves.

The magenta and cyan plot lines show the LO leakage levels when the LO leakage minimization algorithm operates with attenuator 7 only, then applies the same compensation values found for attenuator 7 to all other RF attenuator settings. LO leakage minimization at lower attenuator settings is improved.

The chart 400 shows the DC compensation values (columns C and D) that the ZIF radio compensation method 200, steps 200 through 206, calculated for calibrating all seven attenuators in the presence of a −25 dBm and −30 dBm interferer, respectively.

In some embodiments, the absolute LO leakage average power, measured in dBm and designated as R, can be related to an orthogonal frequency division multiplexing (OFDM) average signal power. Relative LO leakage, designated as S, 20 dB or lower than a given signal power, i.e., $S \leq -20$ dBc, would allow successful base station signal acquisition. The calculation of S for columns E and H is as follows:

Inject a CW (continuous wave) signal from a signal generator, into the radio's antenna port 20, and adjust the signal generator's output the so that the sinusoid's positive peak voltage represented by the amplified baseband signal 68 at the A/D converter 38 input reaches the converter's maximum input voltage value. This is ensured by observation of the voltage waveform at the A/D converter 38 input using an oscilloscope. These peak values correspond to a reference power level of 0 dBfs, i.e., 0 dB relative to the full scale A/D converter 38 input.

The CW signal's average power will be 3 dB below its peak power, or −3 dBfs

Measure the CW signal's average power at a tap-off point, typically a high-impedance circuit design just for making these measurements, at the ADC converter 38 input using a power meter. This value will be in dBm. Designate it as P. The high impedance circuit may introduce some signal attenuation such that the measured average power is not the actual average power of the amplified baseband signal 68. This does not impact the final result obtained below in dBc, since that result is a relative value and not an absolute value. Any non-zero signal attenuation due to the high impedance measurement circuit will cancel out in the equations. The remaining procedure will thus assume the signal attenuation due to the high impedance measurements circuit is zero without any loss of generality.

The automatic gain circuit of the modem, in some embodiments, adjusts the RF and BB gains such that the desired OFDM signal's average power at the A/D converter 38 input is at a fixed power below the reference power, in this example, −20 dBfs The value of that OFDM signal at the measurement point would then be: P dBm+3 dB-20 dB.

Now, when measuring the LO leakage power with the power meter at the measurement point, it can be related to this constant OFDM signal, S=R dBm−(P dBm+3 dB-20 dB), where S is in dBc, or dB relative to the "carrier", which in this case is the OFDM signal.

Because no additional circuitry is used with the ZIF radio compensation method 200, in some embodiments, a cheaper modem may be used. Further, because only a single compensation value need be calculated before network entry, the ZIF radio compensation method 200 results in faster network entry.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A method comprising:
    calculating an initial compensation value to cancel out an unwanted direct current offset during a predetermined gain setting of a zero intermediate frequency radio in a receiver;
    using a known function of the initial compensation value for other gain settings of the zero intermediate frequency radio during entry of the receiver into a network; and
    calculating additional compensation values for the other gain settings while the receiver is in a known period of non-interference following network entry.

2. The method of claim 1, calculating an initial compensation value to cancel out an unwanted direct current offset during a predetermined gain setting of a zero intermediate frequency radio in a receiver further comprising:
    calculating the initial compensation during a low-gain setting of the radio.

3. The method of claim 1, calculating an initial compensation value to cancel out an unwanted direct current offset during a predetermined gain setting of a zero intermediate frequency radio in a receiver further comprising:
    switching a radio frequency gain setting of the zero intermediate frequency radio to the predetermined gain setting;
    measuring leakage from a local oscillator in the zero intermediate frequency radio for the predetermined gain setting; and
    calculating the initial compensation value for the measured leakage from the local oscillator.

4. The method of claim 1 using a known function of the initial compensation value for other gain settings of the zero intermediate frequency radio during entry of the receiver into a network further comprising:
    assigning the initial compensation value to other gain settings of the zero intermediate frequency radio besides the predetermined gain setting;

activating a modem coupled to the radio to perform network entry until the modem is synchronized to the network.

5. The method of claim 1 using a known function of the initial compensation value for other gain settings of the zero intermediate frequency radio during entry of the receiver into a network further comprising:

deriving compensation values for the other gain settings based on a known relationship between the predetermined gain setting and the other gain settings;

assigning the derived compensation values to the other gain settings; and activating a modem coupled to the radio to perform network entry until the modem is synchronized to the network.

6. The method of claim 1, calculating additional compensation values for the other gain settings while the receiver is in a known period of non-interference following network entry further comprising:

obtaining known period of non-interference information from a base station synchronized with the receiver;

waiting until the known period of non-interference occurs; and for each other gain setting, calculating associated compensation values during the known period of non-interference.

7. A direct current offset compensation method for a zero intermediate frequency radio, comprising:

calculating a first compensation value to cancel out an unwanted direct current offset for a predetermined attenuation of the zero intermediate frequency radio, wherein the radio is isolated enough to reliably calculate the first compensation value;

calculating additional compensation values for other attenuations of the zero intermediate frequency radio using a known function, wherein the known function is derived from a known relationship between the attenuations of the radio; and entering a communications network by a receiver with the zero intermediate frequency radio using the calculated compensation values.

8. The direct current offset compensation method for a zero intermediate frequency radio of claim 7, further comprising:

recalculating the additional compensation values for the other attenuations during a known period of non-interference, wherein the known period of non-interference is communicated to the receiver by a serving base station in the communications network.

9. The direct current offset compensation method for a zero intermediate frequency radio of claim 7, calculating the first compensation value further comprising:

switching a radio frequency attenuation of the zero intermediate frequency radio to the predetermined attenuation;

measuring leakage from a local oscillator in the zero intermediate frequency radio for the predetermined attenuation; and calculating the first compensation value for the measured leakage from the local oscillator.

10. The direct current offset compensation method for a zero intermediate frequency radio of claim 7, calculating additional compensation values for other attenuations of the zero intermediate frequency radio using a known function further comprising:

testing a representative set of zero intermediate frequency radios; and deriving the known function based on the testing if a relationship is identified among the representative set.

11. The direct current offset compensation method for a zero intermediate frequency radio of claim 7, calculating additional compensation values for other attenuations of the zero intermediate frequency radio using a known function further comprising:

testing the zero intermediate frequency radio at all attenuations; and deriving the known function based on an identified relationship between the different attenuations.

12. A receiver comprising:

a modem to connect the receiver to a communications network; and a zero intermediate frequency radio, comprising:

an antenna to receive a wireless signal;

a local oscillator to generate a second signal, wherein the second signal is mixed with the wireless signal, resulting in a mixed signal; and a circuit to cancel an unwanted direct current component from the mixed signal by calculating different compensation values at each gain setting of the radio, the circuit to:

calculate an initial compensation value during a predetermined gain setting of the radio;

use a known function of the calculated compensation value to obtain other gain settings of the zero intermediate frequency radio during entry of the receiver into a network; and calculate additional compensation values for the other gain settings while the receiver is in a known period of non-interference following network entry.

13. The receiver of claim 12, further comprising:

an antenna switch to enable or disable the antenna;

wherein, when the antenna is disabled, the receiver is sufficiently isolated to calculate a compensation value when the radio is at a low-gain setting.

14. The receiver of claim 12, further comprising:

an analog-to-digital converter to convert the mixed signal to a digital signal before the signal is transmitted by the modem over the communications network.

15. The receiver of claim 12, the circuit further comprising:

a measurement algorithm to obtain the compensation values based on the direct current component measured at each gain setting.

16. The receiver of claim 12, wherein the known function of the calculated compensation value comprises a replication of the calculated compensation value for each other gain setting.

17. The receiver of claim 12, wherein known function of the calculated compensation value comprises deriving the calculated compensation value for each other gain setting based on a function describing a relationship between the different gain settings.

18. The receiver of claim 12, further comprising:

a low-pass filter to filter the mixed signal, resulting in a baseband signal.

19. The receiver of claim 18, further comprising:

a summing circuit to combine the baseband signal with the calculated compensation value.

20. The receiver of claim 12, further comprising:

a second summing circuit to combine the baseband signal with the calculated compensation value, the baseband signal comprising a real (or in-phase) part and an imaginary (or quadrature) part, wherein the summing circuit processes the real part and the second summing circuit processes the imaginary part.

* * * * *